United States Patent Office 2,840,209
Patented June 24, 1958

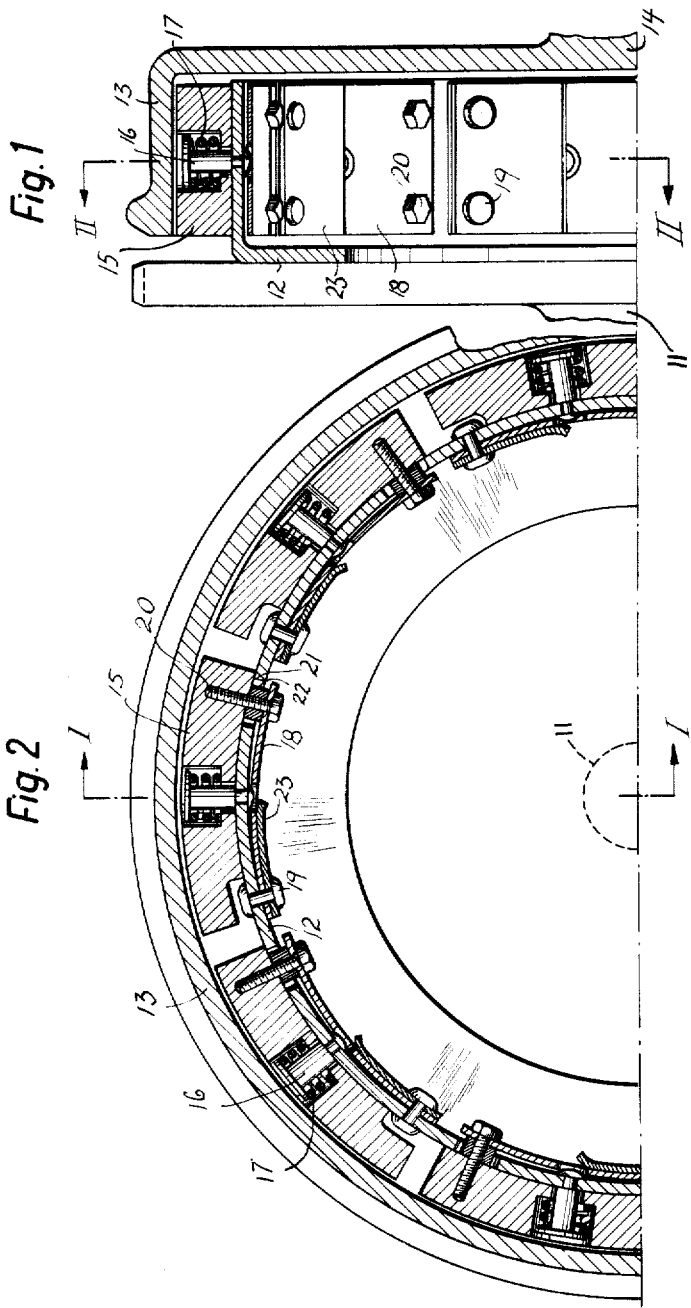

2,840,209
ARRANGEMENT OF LEAF SPRINGS IN CENTRIFUGAL FRICTION CLUTCHES

Richard Binder, Schweinfurt am Main, Germany, assignor to Fichtel & Sachs A. G., Schweinfurt am Main, Germany, a corporation of Germany Application October 22, 1956, Serial No. 617,525

Claims priority, application Germany November 22, 1955

5 Claims. (Cl. 192—105)

The present invention relates to a novel centrifugal clutch. More particularly, it relates to a centrifugal friction clutch in which the centrifugal weights are positioned as closely as possible to the friction surface with which they cooperate when the clutch is engaged.

In conventional centrifugal clutches, the centrifugal weights which function as movable clutch members are provided at their outer faces with a suitable facing of friction material and are pressed by centrifugal force against the cylindrical inner face of a drum to rotate a driven shaft. In such clutches the clutch members and/or the centrifugal weights are frequently connected by leaf springs with a supporting structure which permits the clutch members to move radially and simultaneously to ensure a positive transmission of torque without play or lost motion. These leaf springs, which are used for attaching the centrifugal weights to the supporting member are ordinarily positioned on the outer surface of the supporting member so that the centrifugal weights are necessarily spaced outwardly away from the supporting member.

This conventional arrangement has the drawback that the individual positions of the several centrifugal weights are rendered inexact and difficult to regulate or adjust by the interposition of the leaf springs and/or other intermediate members between the outer surface of the supporting driving member and the individual centrifugal weight itself. In order to compensate for this inexactitude, it is necessary to provide a fairly large zero speed spacing between the friction surface on each centrifugal weight and the cooperating friction surface of the driven drum. This large spacing leads to other disadvantages, such as excessive noise upon engagement of the friction surfaces of the weights against the cooperating friction surface of the drum, and also renders it difficult to balance the clutch.

It is accordingly an object of the invention to provide a centrifugal friction clutch which is substantially noiseless during operation.

A further object of the invention is to provide a clutch of the class described wherein the spacing between the weights and the driven drum on which they act is kept to a minimum.

Still another object of the invention is to provide a clutch of the class described wherein the spacing between the weights and the drum can be preadjusted with accuracy prior to assembly of the clutch so that precise balancing of the clutch is easily effected.

These and other objects and advantages are realized in accordance with the present invention wherein the centrifugal weight members are spring pressed directly against the outer surface of the driving member. The connecting leaf springs are disposed on the inner surface of the driving member and the connection between the leaf springs and the weights is made by bolts which pass through appropriate apertures in the driving member. This arrangement of the leaf springs provides the further advantage that the leaf springs, prior to assembly, may be flat and they will assume the necessary curvature when applied to the inner surface of the driving member.

The invention can be applied both to clutches with cylindrical supporting or driving members and to clutches with polygonal driving members, in which latter case, the leaf springs will be flat after assembly. In this latter situation, the flat leaf springs will extend parallel to the flat inner surfaces of the walls of the polygonal driving member.

The invention will now be described more particularly with reference to the accompanying drawing, wherein:

Fig. 1 is a sectional view taken along line I—I of Fig. 2, showing the upper half of a clutch, the lower half being identical; and Fig. 2 is a sectional view taken along line II—II of Fig. 1.

Referring more particularly to the drawing, in Fig. 1 there is shown a driving shaft 11 adapted to be driven by an engine or other prime mover (not shown) of a motor vehicle or the like. A cylindrical supporting or driving member 12 is operatively connected to and rotated by the shaft 11. A driven drum 13 is spaced from the driving member 12 and is connected with a driven or output shaft 14 which does not rotate with the friction members in the position shown in Figs. 1 and 2 because there is no operative connection between the driving member 12 and the driven drum 13.

A plurality of arcuate centrifugal weights 15, which may be advantageously provided on their outer peripheries with suitable friction facings (not shown), are spring pressed directly against the outer surface of the driving member 12 and the outer faces of the weights 15 are spaced only slightly from inner surface of the drum. Bolts 16 extend from the cage 12 into the weights 15 and helical compression springs 17 urge the weights against the outer surface of the driving member. Each weight 15 is provided with a leaf spring 18 which is connected at one end by rivets 19 to the driving member 12 and the other end is rigidly connected by bolts 20 to its associated weight 15, the bolt 20 passing in each instance, freely through an aperture 21 provided in the wall of the driving member 12. An intermediate spacer member 22 surrounds each bolt 20 and maintains the associated weight 15 spaced away from the free end of the leaf spring 18, the spacer member 22 also serving to space the corresponding end of spring 18 slightly from the adjacent surface of the wall of the driving member. In order to provide the most favorable conditions of flexural stress for the leaf springs, an individual backstop 23 abuts each spring on the surface remote from the driving member 12 and is held assembled to the driving member 12 by the same rivets 19 which connect the associated leaf spring 18 thereto. A portion of each backstop 23, i. e., the free end thereof, is curved away from its associated leaf spring and the free end has a smaller radius of curvature than that of the cylindrical wall of the driving member 12, thereby permitting limited free flexure of the leaf spring 18. Moreover, as shown in the drawing, there is no sliding engagement between each weight 15 and the associated stud 16 which holds the outer end of the compression spring 17. Thus, independently of any spring action, each leaf spring 18 acts as a frictionless guide member which maintains the weights 15 and studs 16 spaced apart during the small radial displacements of each weight.

Since the outer faces of the weights and the cooperating friction face of the drum are accurately dimensioned along with the driving member 12, the fact that the weights are spring-pressed directly against the outer surface of the driving member 12 permits the spacing between the weights and drum to be set with precision, even prior to assembly of the clutch. The absence of any intermediate member between the inner surfaces of the weights and the outer surface of the driving member 12 eliminates inaccuracies and avoids the need for an unduly large spacing. In practice, it has been found that the spacing can be made extremely small, on the order of magnitude of 0.2 to 0.4 mm., so that the overall dimensions of the clutch can be kept to a minimum. Balancing of the clutch is also simplified, and since the weights are accurately dimensioned there is no uneven or abrupt engagement between some of the weights and the drum. As a result, noise is reduced and uneven wear of the weights, or the friction facings when provided, is avoided.

Where the cage is cylindrical in contour the leaf springs which carry the weight can still be flat prior to assembly and need not be arcuate. Upon assembly, the accompanying flexure of the spring will cause it to assume the desired arcuate form approximately conforming to the contour of the inner surface of the driving member 12 and the permanent connection of the rivets 19 will serve to maintain the spring in the desired position. A further advantage resulting from positioning of the weights by leaf springs according to the invention resides in the fact that centrifugal force and other stresses acting upon the individual springs do not tend to cause buckling of the springs.

Various changes and modifications may be made without departing from the spirit and scope of the invention as defined in the annexed claims.

What is claimed is:

1. A centrifugal friction clutch of the class described, comprising a revoluble driving member adapted to be connected to a prime mover for rotation thereby, said driving member having an axially extending wall which symmetrically surrounds its axis of rotation, a driven drum coaxial with said driving member and having an inner cylindrical friction surface concentric with said axis of rotation, a plurality of symmetrically arranged radially movable centrifugal weights carried by said driving member exteriorly of said wall, each of said weights having a segmental cyclindrical surface disposed for frictional engagement with said friction surface of said driven member upon outward radial displacement of said weight, spring means pressing each of said weights directly against the outer surface of said wall, a flexible leaf spring associated with each weight, each leaf spring being disposed interiorly of said wall, means fixedly securing one end portion of each leaf spring to the inner surface of said wall, and connecting means freely movable through said wall, said connecting means rigidly connecting the other end portion of each leaf spring to one of said weights for frictionless guiding of said weight during radial movement thereof in response to changes in the angular velocity of said driving member.

2. A clutch according to claim 1, further comprising an elongated backstop member directly engaging each leaf spring, each backstop member being secured to said wall along with said one end of said leaf spring, said backstop member limiting inward radial movement of said other end of its associated leaf spring independently of said spring pressed engagement of its associated weight with said outer surface of said wall.

3. A clutch according to claim 1 in which said wall is cylindrical.

4. A clutch according to claim 3, in which each weight has an inner surface of arcuate configuration shaped for engagement with the outer surface of said cylindrical wall.

5. A clutch according to claim 1, in which each of said weights has an aperture formed therein, said clutch further comprising a supporting member having one end fixed to said wall and the other end spaced from and extending freely into said aperture, and wherein said spring means comprises a further spring disposed in said aperture and engaging both said weight and said supporting member, each of said leaf springs maintaining its associated weight positioned for radial movement with said weight spaced from and freely radially moveable with respect to said supporting member.

References Cited in the file of this patent

UNITED STATES PATENTS

| | | |
|---|---|---|
| 2,027,970 | Gillies | Jan. 14, 1936 |
| 2,376,665 | Cross | May 22, 1945 |
| 2,691,437 | Dalrymple | Oct. 12, 1954 |